United States Patent
Huang et al.

(10) Patent No.: US 8,189,073 B2
(45) Date of Patent: May 29, 2012

(54) TONE ADJUSTMENT METHOD FOR DIGITAL IMAGE AND ELECTRONIC APPARATUS USING THE SAME

(75) Inventors: Yu-Chen Huang, Jhudong Township (TW); Ming-Jiun Liaw, Jhudong Township (TW)

(73) Assignee: Altek Corporation, Hsinchu (TW)

( * ) Notice: Subject to any disclaimer, the term of this patent is extended or adjusted under 35 U.S.C. 154(b) by 315 days.

(21) Appl. No.: 12/485,713

(22) Filed: Jun. 16, 2009

(65) Prior Publication Data

US 2009/0316019 A1 Dec. 24, 2009

(30) Foreign Application Priority Data

Jun. 20, 2008 (TW) .............................. 97123198 A

(51) Int. Cl.
*H04N 9/68* (2006.01)
*H04N 5/238* (2006.01)
*G06K 9/40* (2006.01)

(52) U.S. Cl. ........ 348/235; 348/234; 348/364; 348/365; 382/260; 382/262; 382/265

(58) Field of Classification Search .................. 348/234, 348/235, 364, 365; 382/260, 274
See application file for complete search history.

(56) References Cited

U.S. PATENT DOCUMENTS

| | | | | |
|---|---|---|---|---|
| 5,012,333 A * | 4/1991 | Lee et al. ...................... | 358/520 |
| 6,167,165 A * | 12/2000 | Gallagher et al. ............. | 382/263 |
| 6,285,798 B1 * | 9/2001 | Lee ................................ | 382/260 |
| 6,317,521 B1 * | 11/2001 | Gallagher et al. ............. | 382/260 |
| 6,438,264 B1 * | 8/2002 | Gallagher et al. ............. | 382/167 |
| 7,065,257 B2 * | 6/2006 | Soga et al. ..................... | 382/274 |
| 7,280,703 B2 * | 10/2007 | Gallagher et al. ............. | 382/260 |
| 7,315,656 B2 * | 1/2008 | Von Thal et al. .............. | 382/254 |
| 7,409,101 B2 * | 8/2008 | Von Thal et al. .............. | 382/254 |
| 7,471,847 B2 * | 12/2008 | Yano .............................. | 382/274 |
| 7,650,045 B2 * | 1/2010 | Yano .............................. | 382/274 |
| 7,652,808 B2 * | 1/2010 | Bala ............................... | 358/520 |
| 7,656,442 B2 * | 2/2010 | Tsuruoka ....................... | 348/241 |
| 7,672,528 B2 * | 3/2010 | Gallagher et al. ............. | 382/256 |
| RE42,148 E * | 2/2011 | Sheraizin et al. .............. | 382/270 |
| 7,899,266 B2 * | 3/2011 | Mitsunaga ..................... | 382/274 |
| 7,903,898 B2 * | 3/2011 | Ito et al. ......................... | 382/254 |
| 7,970,234 B2 * | 6/2011 | Park et al. ...................... | 382/275 |
| 8,000,554 B2 * | 8/2011 | Li et al. .......................... | 382/274 |
| 2003/0052979 A1 * | 3/2003 | Soga et al. ..................... | 348/241 |
| 2003/0184661 A1 * | 10/2003 | Yubata et al. ................. | 348/229.1 |
| 2003/0228064 A1 * | 12/2003 | Gindele et al. ................ | 382/260 |
| 2008/0012992 A1 * | 1/2008 | Arici et al. ..................... | 348/687 |
| 2008/0055426 A1 * | 3/2008 | Pertsel et al. .................. | 348/223.1 |
| 2008/0094489 A1 * | 4/2008 | Takamoto ...................... | 348/241 |

(Continued)

*Primary Examiner* — Sinh Tran
*Assistant Examiner* — Selam Gebriel
(74) *Attorney, Agent, or Firm* — Workman Nydegger

(57) ABSTRACT

A tone adjustment method for a digital image and an electronic apparatus using the same are presented. A digital image is loaded. A detail image layer and a primary image layer are generated according to the digital image. A tone mapping procedure is performed on the primary image layer, for generating a tone mapping layer. A detail gain lookup table is loaded and then a corresponding gain is looked up according to each pixel value in the primary image layer, for generating a detail gain adjustment layer. A detail gain control procedure is performed and then a detail gain adjustment is performed on the detail gain adjustment layer and the detail image layer, for generating a gain correction layer. The gain correction layer and the tone mapping layer are combined, and then a combined layer is output, thereby completing the tone adjustment for the digital image.

5 Claims, 6 Drawing Sheets

U.S. PATENT DOCUMENTS

| | | | |
|---|---|---|---|
| 2009/0040376 A1* | 2/2009 | Kobayashi | 348/452 |
| 2009/0161953 A1* | 6/2009 | Ciurea et al. | 382/172 |
| 2009/0324135 A1* | 12/2009 | Kondo et al. | 382/284 |
| 2010/0188531 A1* | 7/2010 | Cordes et al. | 348/235 |
| 2010/0310166 A1* | 12/2010 | Moriya et al. | 382/167 |
| 2011/0096201 A1* | 4/2011 | Yoo et al. | 348/235 |

* cited by examiner

TONE ADJUSTMENT METHOD FOR DIGITAL IMAGE AND ELECTRONIC APPARATUS USING THE SAME

CROSS-REFERENCE TO RELATED APPLICATIONS

This non-provisional application claims priority under 35 U.S.C. §119(a) on Patent Application No(s). 097123198 filed in Taiwan, R.O.C. on Jun. 20, 2008 the entire contents of which are hereby incorporated by reference.

BACKGROUND OF THE INVENTION

1. Field of Invention

The present invention relates to a digital image processing method and an electronic apparatus using the same, and more particularly to a tone adjustment method for a digital image and an electronic apparatus using the same.

2. Related Art

With rapid development of digital cameras, more and more people participate in photography. However, when a digital camera is used to capture an image, display result of the digital image may be affected by a photometric mechanism of the digital camera. If contrast brightness in the digital image is too high, the captured digital image is prone to have a white background although brightness of a captured subject is normal. Therefore, in order to correct a high dynamic range image in the digital image, some scholars proposed a method using tone mapping, so as to make the digital image display an interesting image range of human eyes as far as possible in a low dynamic range.

However, since contrast brightness does not change linearly during the tone mapping process, contrast suppression or contrast over-amplification may take place in some portions of the image after the tone mapping is performed on the digital image. For example, when brightness of a shadow portion of the digital image is increased, too much noise is liable to appear.

SUMMARY OF THE INVENTION

Accordingly, the present invention is directed to provide a tone adjustment method for a digital image, which reduces a contrast deterioration degree of the digital image caused by a tone adjustment performed on the digital image.

In order to achieve the above objective, the present invention provides a tone adjustment method for a digital image, which includes the following steps. A digital image is loaded. A detail image layer and a primary image layer are generated according to the digital image. A tone mapping procedure is performed on the primary image layer, so as to generate a tone mapping layer. A detail gain lookup table is provided to look up a gain adjustment according to the value of each pixel in the primary image layer, so as to generate a detail gain adjustment layer. A detail gain control procedure is performed on the detail gain adjustment layer and the detail image layer, so as to generate a gain correction layer. The gain correction layer and the tone mapping layer are combined, and then a combined layer is output.

The present invention is further directed to provide a tone adjustment method for a digital image, which reduces a contrast deterioration of the digital image caused by a tone adjustment performed on the digital image.

In order to achieve the above objective, the present invention provides a tone adjustment method for a digital image, which includes the following steps. A digital image is loaded. A detail image layer and a primary image layer are respectively generated according to the digital image. A tone mapping procedure is performed on the primary image layer, so as to generate a tone mapping layer. A positive detail gain table and a negative detail gain table are provided. The positive detail gain table is used for a positive pixel value in the detail image layer and then a gain adjustment is looked up according to the pixel value in the primary image layer corresponding to the positive detail pixel. The negative detail gain table is used for a negative pixel value in the detail image layer and then a gain adjustment is looked up according to the pixel value in the primary image layer corresponding to the negative detail pixel, so as to generate a detail gain adjustment layer. A detail gain control procedure is performed on the detail gain adjustment layer and the detail image layer, so as to generate a gain correction layer. The gain correction layer and the tone mapping layer are combined, and then a combined layer is output.

The present invention is also directed to provide an electronic apparatus for adjusting a tone of a digital image, which reduces a contrast deterioration degree of the digital image caused by a tone adjustment performed on the digital image.

In order to achieve the above objective, the present invention provides an electronic apparatus for adjusting a tone of a digital image, which includes a storage unit and a processing unit. The storage unit is adapted to store at least one digital image, a detail gain lookup table, and a tone adjustment procedure. The processing unit is electrically connected to the storage unit and adapted to perform the tone adjustment procedure so as to adjust the tone of the digital image.

The present invention provides a tone adjustment method for a digital image and an apparatus using the same, which reduce a contrast deterioration of the digital image caused by a tone adjustment performed on the digital image. A corresponding detail gain table is provided at areas of different brightness for the digital image, which can alleviate noise caused by an increase in level of a dark portion. A positive detail gain table and a negative detail gain table are also provided, so as to more finely adjust contrast variations of the digital image in both positive and negative directions. For example, occurrence of overshooting in bright areas can also be suppressed by adjusting positive gains of areas of middle and high brightness.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
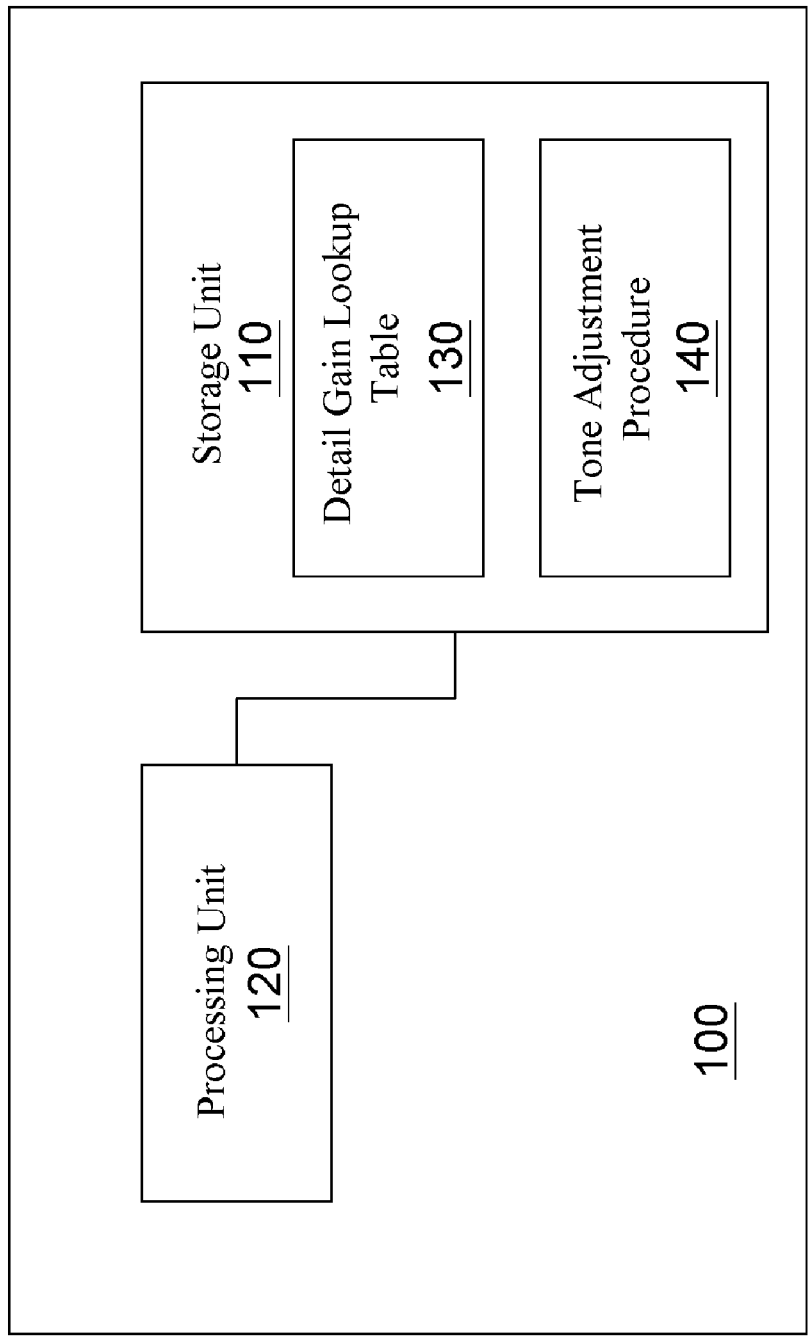
FIG. 1 is a schematic architectural view of the present invention.

FIG. 1 is a schematic architectural view of the present invention. Referring to FIG. 1, an electronic apparatus of the present invention is applicable in, but not limited to, personal computers, notebook personal computers, hand-held computing apparatus, digital cameras, or other electronic apparatuses with computing functions. An electronic apparatus 100 for adjusting tone of a digital image at least includes a storage unit 110 and a processing unit 120. The storage unit 110 is adapted to store a digital image, a detail gain lookup table 130, and a tone adjustment procedure 140. The processing unit 120 is electrically connected to the storage unit 110 and adapted to perform the tone adjustment procedure 140 so as to adjust the tone of the digital image.

Figure 2A:
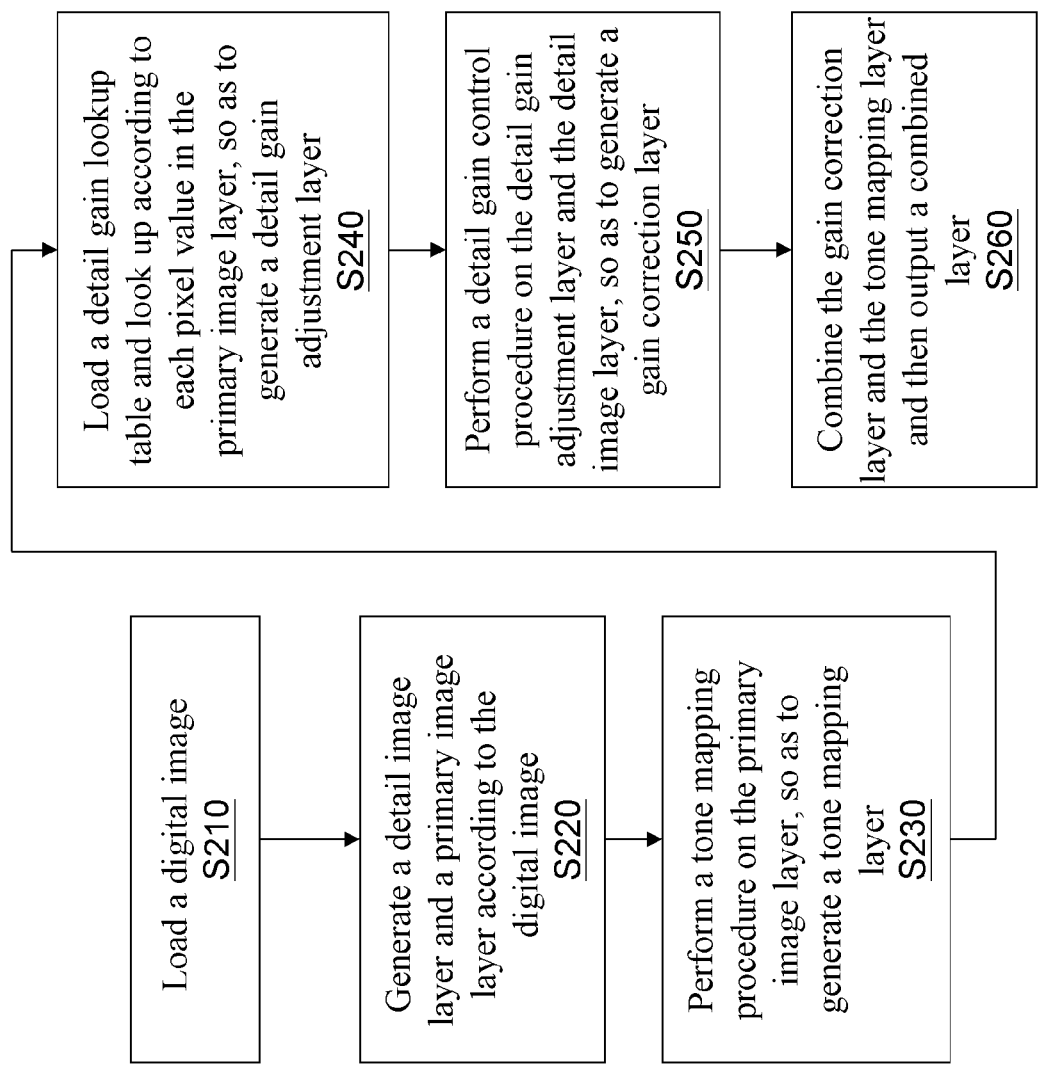
FIG. 2a is a flow chart of processes of the present invention.
Figure 2B:
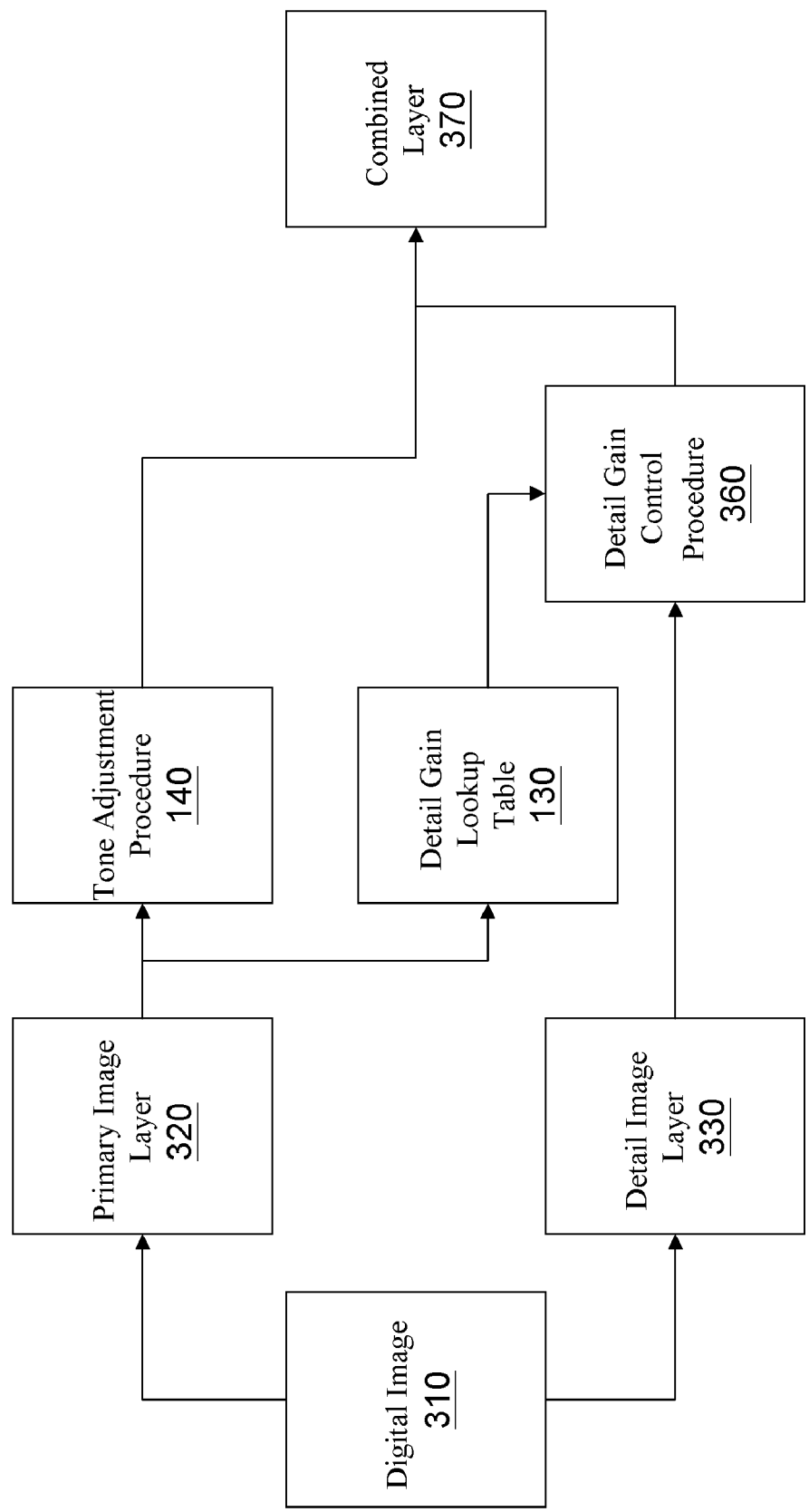
FIG. 2b is a timing chart of processes of a tone adjustment procedure according to the present invention.

FIG. 2a and FIG. 2b are respectively a flow chart and a timing chart of processes of a tone adjustment procedure according to the present invention. Referring to FIG. 2a and FIG. 2b, a tone adjustment procedure 140 includes the following steps. A digital image is loaded (Step S210). A detail image layer and a primary image layer are generated according to the digital image (Step S220). The primary image layer 320 is obtained from the digital image 310 after being subjected to a smoothing filter or an edge preserving smooth filter.

More particularly, the primary image layer 320 records a relatively large observation range in the digital image 310. In other words, the primary image layer 320 is a low frequency signal in the digital image 310. The detail image layer 330 may be considered as a difference between the digital image 310 and the primary image layer 320. The detail image layer 330 may be obtained by using the digital image 310 to subtract or divide the primary image layer 320. A physical meaning represented by the detail image layer 330 is detail variations and contrast variations of the digital image 310 in a small observation range. Therefore, the detail image layer 330 is a high frequency signal of the digital image 310.

A tone mapping procedure is performed on the primary image layer, so as to generate a tone mapping layer (Step S230). The tone adjustment procedure 140 is to greatly change the level according to a set mapping curve so as to display details hidden in dark portions. However, the procedure may suppress other certain levels, that is, may make contrast of some areas of the image degraded if no other procedure is performed to preserve the contrast.

Figure 3:
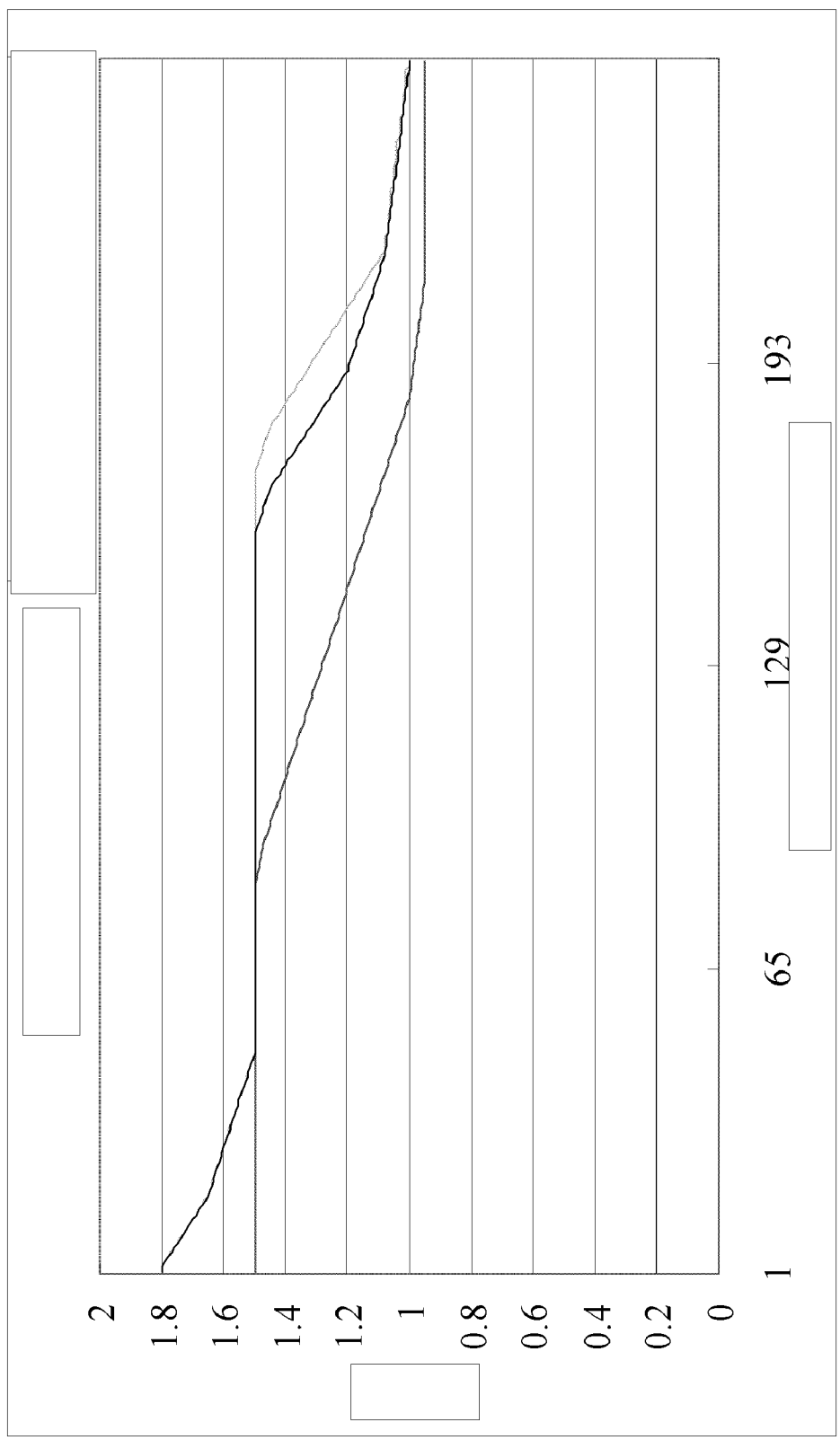
FIG. 3 is a schematic view of a detail gain lookup table according to the present invention.

A detail gain lookup table is loaded to look up a gain adjustment according to each pixel in the primary image layer, so as to generate a detail gain adjustment layer (Step S240). FIG. 3 is a schematic view of a detail gain lookup table according to the present invention. In addition to the detail gain lookup table 130 shown in FIG. 3, different detail gain lookup tables 130 may also be loaded according to the digital image 310 in different shooting environments.

Then, a detail gain control procedure is performed, so as to perform a detail gain control over the detail gain adjustment layer and the detail image layer and generate a gain correction layer (Step S250). The detail gain control procedure 360 performs a detail gain control over the detail gain adjustment layer and the detail image layer and generate a gain correction layer. The gain correction layer and the tone mapping layer are combined, and then a combined layer is output (Step S260).

Figure 4A:
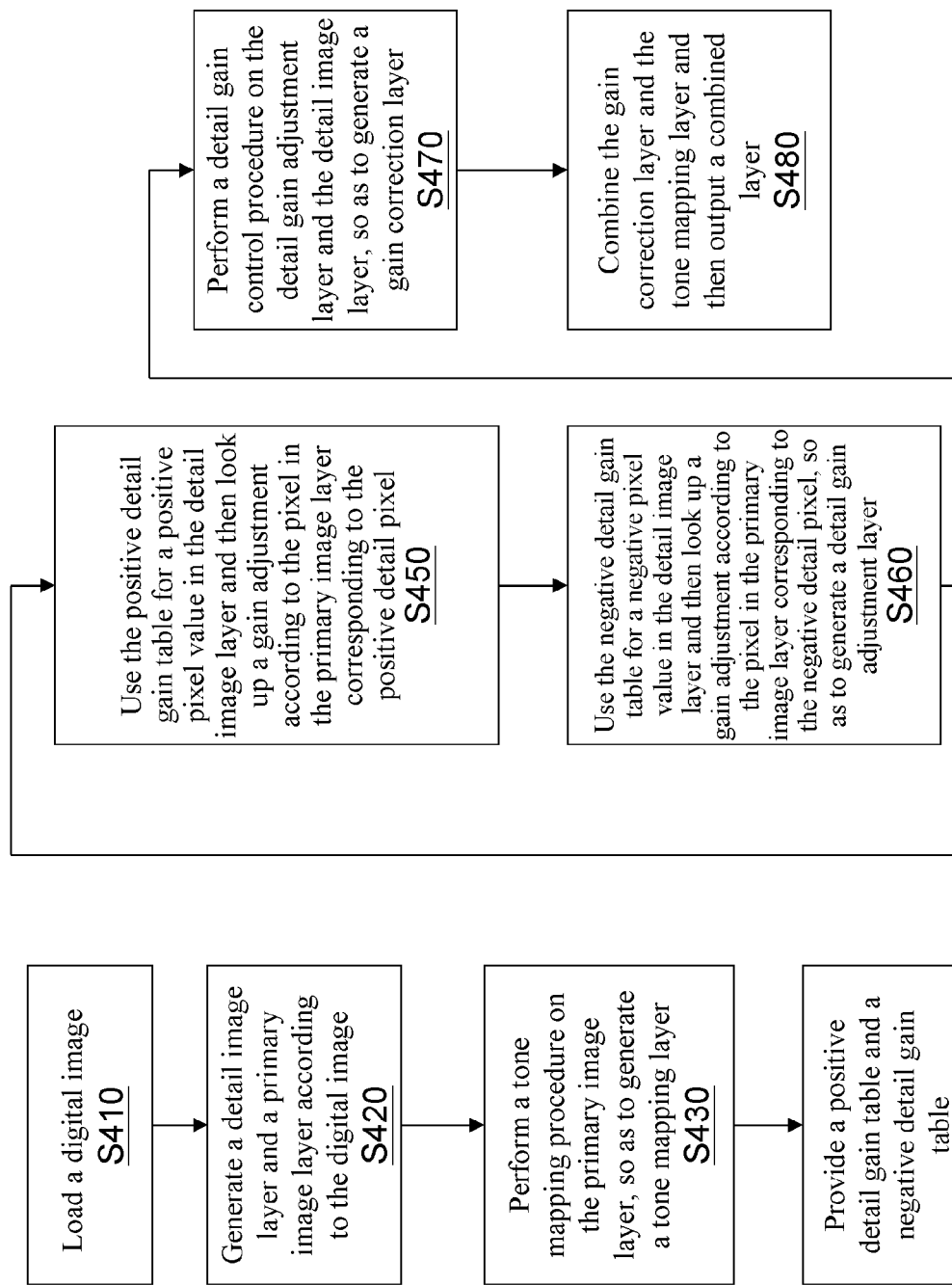
FIG. 4a is a flow chart of operations according to another embodiment of the present invention.
Figure 4B:
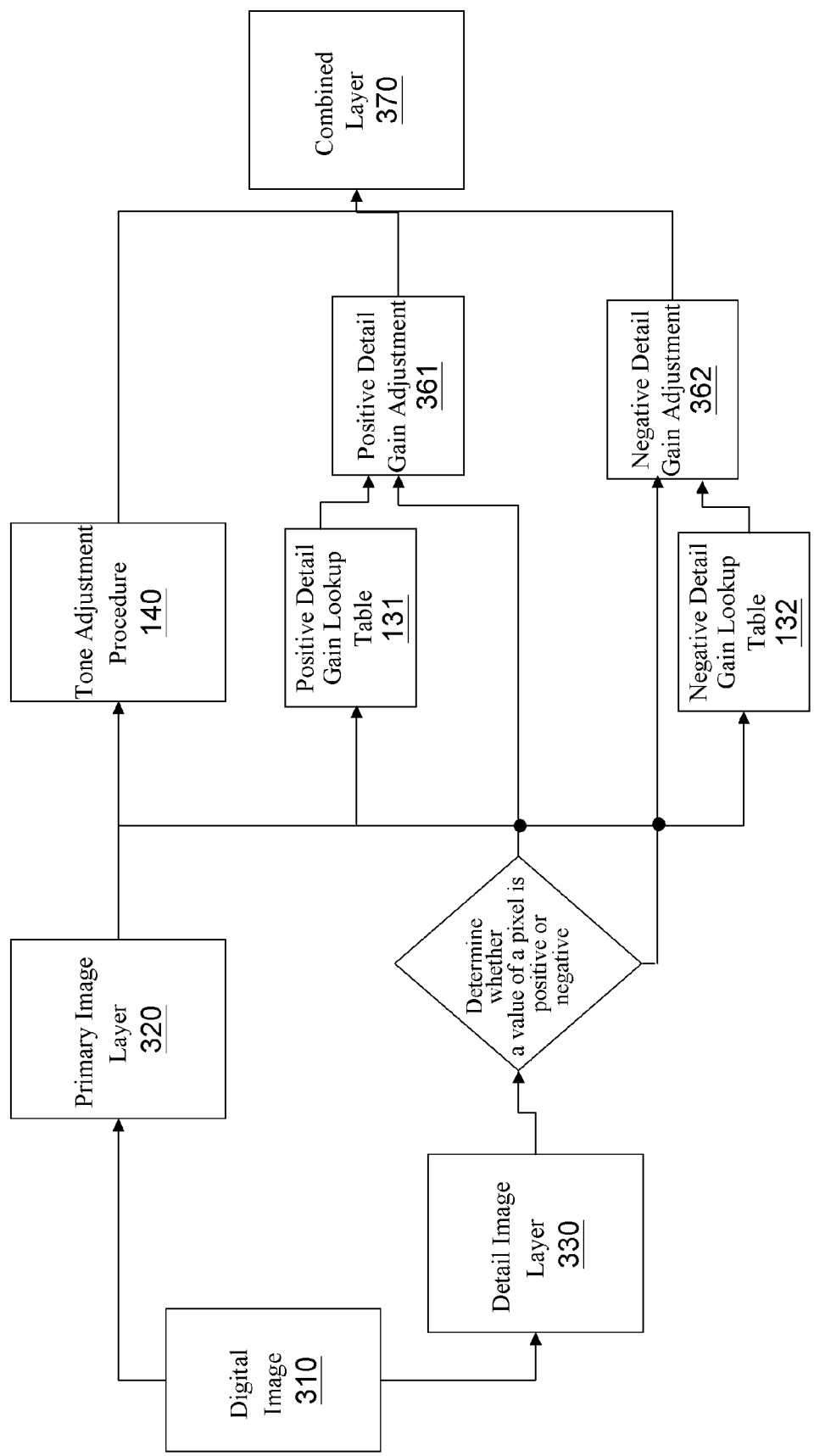
FIG. 4b is a flow chart of processes of a tone adjustment procedure according to another embodiment of the present invention.

FIG. 4a and FIG. 4b are respectively a flow chart of operations and a flow chart of processes according to another embodiment of the present invention. Referring to FIG. 4a and FIG. 4b, A digital image is loaded (Step S410). A detail image layer and a primary image layer are respectively generated according to the digital image (Step S420). A tone mapping procedure is performed on the primary image layer, so as to generate a tone mapping layer (Step S430).

A positive detail gain table and a negative detail gain table are offered (Step S440). In another embodiment of the present invention, a corresponding detail gain lookup table 130 is provided according to a positive or negative value of each pixel in the detail image layer 330. The positive detail gain table is used for a positive pixel value in the detail image layer and then a gain adjustment is looked up according to the pixel value in the primary image layer corresponding to the positive detail pixel (Step S450). The negative detail gain table is used for a negative pixel value in the detail image layer and then a gain adjustment is looked up according to the pixel value in the primary image layer corresponding to the negative detail pixel, so as to generate a detail gain adjustment layer (Step S460). A detail gain control procedure is performed on the detail gain adjustment layer and the detail image layer, so as to generate a gain correction layer (Step S470). The gain correction layer and the tone mapping layer are combined, and then a combined layer is output (Step S480).

The present invention presents a tone adjustment method for the digital image 310 and an apparatus using the same, which reduce a contrast deterioration of the digital image 310 caused by a tone adjustment performed on the digital image 310. A corresponding detail gain table is provided at areas of different brightness for the digital image 30, which can alleviate noise caused by an increase in level of a dark portion. In another embodiment, a positive detail gain table and a negative detail gain table are also provided, so as to more finely adjust contrast variations of the digital image 310 in both positive and negative directions. For example, occurrence of overshooting in bright areas can be suppressed by adjusting positive gains of areas of middle and high brightness. Finally, the above gain correction layer and the tone mapping layer are combined, and then a combined layer 370 is output.

What is claimed is:

1. A tone adjustment method for a digital image, applicable to reduce a contrast deterioration degree of the digital image caused by a tone adjustment performed on the digital image, comprising:

loading a digital image;

generating a detail image layer and a primary image layer according to the digital image;

performing a tone mapping procedure on the primary image layer, so as to generate a tone mapping layer;

loading a positive detail gain table and a negative detail gain table;

providing a selection window, so as to select a portion of image area in the primary image layer of the digital image;

performing a standardized procedure on the image area of the selection window, so as to generate a representative pixel;

when the representative pixel is positive, using the positive detail gain table for the positive representation pixel value in the detail image layer, looking up a corresponding gain value in the positive detail gain table according to the representative pixel, and then perform a gain adjustment on each pixel in the selection window, so as to generate a detail gain adjustment layer;

when the representative pixel is negative, using the negative detail gain table for the negative representation pixel value in the detail image layer, looking up the corresponding gain value in the negative detail gain table according to the representative pixel, and then perform the gain adjustment on each pixel in the selection window, so as to generate the detail gain adjustment layer;

performing a detail gain control procedure and then performing a detail gain adjustment on the detail gain adjustment layer and the detail image layer, so as to generate a gain correction layer; and combining the gain correction layer and the tone mapping layer and then outputting a combined layer.

2. The tone adjustment method for a digital image according to claim 1, wherein the primary image layer is generated after the digital image is processed by a smoothing filter or an edge preserving smooth filter.

3. The tone adjustment method for a digital image according to claim 1, wherein the process of loading the detail gain lookup table further comprises:

generating corresponding gain adjustment of pixels in the detail image layer according to the pixel value of the detail image layer.

4. An electronic apparatus for adjusting tone of a digital image, adapted to reduce a contrast deterioration of the digital image caused by a tone adjustment performed on the digital image, comprising:

a storage unit, adapted to store at least one digital image, a detail gain lookup table, and a tone adjustment procedure, and a processing unit, electrically connected to the storage unit, adapted to perform the tone adjustment procedure so as to adjust the tone of the digital image, wherein the tone adjustment procedure comprises:

generating a detail image layer and a primary image layer according to the digital image;
performing a tone mapping procedure on the primary image layer, so as to generate a tone mapping layer;
loading a positive detail gain table and a negative detail gain table;
providing a selection window, so as to select a portion of image area in the primary image layer of the digital image;
performing a standardized procedure on the image area of the selection window, so as to generate a representative pixel;
when the representative pixel is positive, using the positive detail gain table for the positive representation pixel value in the detail image layer, looking up a corresponding gain value in the positive detail gain table according to the representative pixel, and then perform a gain adjustment on each pixel in the selection window, so as to generate a detail gain adjustment layer;
when the representative pixel is negative, using the negative detail gain table for the negative representation pixel value in the detail image layer, looking up the corresponding gain value in the negative detail gain table according to the representative pixel, and then perform the gain adjustment on each pixel in the selection window, so as to generate the detail gain adjustment layer;
performing a detail gain control procedure on the detail gain adjustment layer and the detail image layer, so as to generate a gain correction layer; and
combining the gain correction layer and the tone mapping layer and then outputting a combined layer.

5. The electronic apparatus for adjusting tone of a digital image according to claim 4, wherein the process of loading the detail gain lookup table further comprises:

generating corresponding gain adjustment of pixels in the detail image layer according to the pixel value of detail image layer.

* * * * *

UNITED STATES PATENT AND TRADEMARK OFFICE
CERTIFICATE OF CORRECTION

| | | |
|---|---|---|
| PATENT NO. | : 8,189,073 B2 | Page 1 of 1 |
| APPLICATION NO. | : 12/485713 | |
| DATED | : May 29, 2012 | |
| INVENTOR(S) | : Huang et al. | |

It is certified that error appears in the above-identified patent and that said Letters Patent is hereby corrected as shown below:

<u>Front Page, Left Hand Column, Item #75</u>
Change "Jhudong" to --Jhunan--

Signed and Sealed this
Eleventh Day of September, 2012

David J. Kappos
*Director of the United States Patent and Trademark Office*